United States Patent [19]

Hosokawa et al.

[11] Patent Number: 5,631,054
[45] Date of Patent: May 20, 1997

[54] POLYESTER CONTAINER AND PROCESS FOR PRODUCING THE SAME

[75] Inventors: Yasunori Hosokawa, Wakayama; Nobuyuki Mita, Chiba; Yutaka Yasuda, Kaizuka, all of Japan

[73] Assignee: Kao Corporation, Tokyo, Japan

[21] Appl. No.: 416,466

[22] Filed: Apr. 4, 1995

Related U.S. Application Data

[63] Continuation of Ser. No. 53,546, Apr. 29, 1993, abandoned.

[30] Foreign Application Priority Data

Apr. 30, 1992 [JP] Japan ................. 4-111329

[51] Int. Cl.$^6$ ................. B29C 49/08
[52] U.S. Cl. ............ 428/36.92; 524/167; 524/370; 264/532
[58] Field of Search ............ 264/532; 524/167, 524/370; 428/35.7, 36.92

[56] References Cited

U.S. PATENT DOCUMENTS

| | | |
|---|---|---|
| 3,546,164 | 12/1970 | Stewart et al. . |
| 4,512,948 | 4/1985 | Jabarin ................. 264/532 X |
| 4,517,328 | 5/1985 | Schmidt et al. . |
| 4,535,901 | 8/1985 | Okudaira et al. ................. 215/1 C |

FOREIGN PATENT DOCUMENTS

| | | |
|---|---|---|
| 0119554 | 9/1984 | European Pat. Off. . |
| 0491947 | 7/1992 | European Pat. Off. . |
| 4876944 | 10/1973 | Japan . |
| 9102111 | 2/1991 | WIPO . |

OTHER PUBLICATIONS

*Proc. Eur. Regional Techn. Conf.: Plastics Process*, 2nd, Klason C. et al., pp. 12–1 to 12–14 (1980).

*Primary Examiner*—Catherine Timm
*Attorney, Agent, or Firm*—Birch, Stewart, Kolasch & Birch, LLP

[57] ABSTRACT

A process for producing a polyester container having a higher strength than usual and a reduced wall thickness, whereby the polyester is present in a reduced amount contributing to resource savings, which includes preparing a polyester resin composition containing a polyester resin and 0.1 to 10 parts by weight, based on 100 parts by weight of the polyester resin, of an additive compound selected from the group consisting of compounds represented by the formula (I):

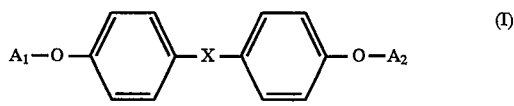

and compounds represented by the following formula (II):

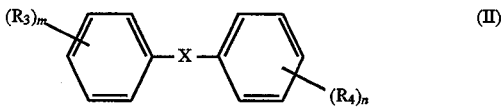

and subjecting the resin composition to stretch blow molding.

18 Claims, No Drawings

POLYESTER CONTAINER AND PROCESS FOR PRODUCING THE SAME

This application is a continuation, of application Ser. No. 08/053,546 filed on Apr. 29, 1993, now abandoned.

BACKGROUND OF THE INVENTION

1. Field of the Invention

The present invention relates to a process for producing a polyester container comprising the step of stretch blow molding, which provides a transparent container having high strength.

2. Description of the Related Art

Polyethylene terephthalate (PET), which is a representative polyester resin, is usually molded into a container by the biaxial stretch blow molding method, and has been widely used as a material for containers because it provides excellent transparency and mechanical strength as well as a relatively good gas barrier.

Meanwhile, in recent years, environmental pollution problems have become important, and the utilization of materials compatible with the environment, resource saving, energy saving, recycling, etc., have been extensively advocated. The development of a container having a thin wall thickness through a reduction in the amount of resin is desired from the view point of resource savings. A significant reduction in the amount of the PET resin, however, causes a reduction of the strength of the container.

Although an increase in the molecular weight of the PET resin is thought to be one of the means for increasing the strength of the container, a mere increase in the molecular weight brings about an unsatisfactory effect with respect to increasing the strength and, what is worse, the melt viscosity becomes so high that the productivity becomes low in the injection step for forming a preform.

WO91/02111 (published on Feb. 21, 1991), the corresponding European Patent Publication-A No. 0491947 (published on Jul. 1, 1992) and the corresponding U.S. Pat. No. 5,162,091 (published on Nov. 10, 1992, Assignee: Kao Corp.) disclose additive compounds for lowering the melt viscosity of PET resins and polyester fiber prepared utilizing the resin composition comprising a PET resin and an additive compound. Although the melt viscosity of the resin composition is reduced by the use of the additive compound, the strength of the fiber prepared with the resin composition containing the additive compound is the same as that of the fiber prepared with the resin composition containing no additive compounds.

DISCLOSURE OF THE INVENTION

Summary of the Invention

Accordingly, the present inventors have made extensive studies with a view toward solving the above-described problem and, as a result, have found that when a specified compound is added to a polyester resin and the mixture thus obtained is subjected to stretch blow molding, not only is the strength of the resultant polyester container increased, but also the amount of the resin used in the container can be reduced, which has led to the completion of the present invention.

Namely, the present invention provides a process for producing a polyester container, which comprises preparing a polyester resin composition comprising a polyester resin and 0.1 to 10 parts by weight, based on 100 parts by weight of the polyester resin, of an additive compound selected from the group consisting of compounds represented by the formula (I):

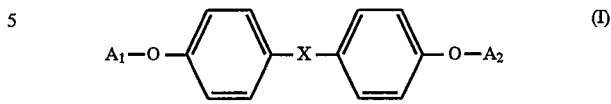

wherein $A_1$ and $A_2$ are each an alkyl or aralkyl group having 6 to 22 carbon atoms and X is

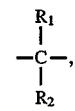

—S—, —SO$_2$—, —O— or a single direct bond (i.e. X is eliminated), wherein $R_1$ and $R_2$ are each a hydrogen atom or an alkyl group having 4 or fewer carbon atoms, preferably 1 or 2 carbon atoms, and compounds represented by the following formula (II):

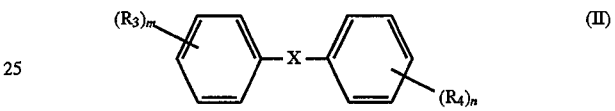

wherein $R_3$ and $R_4$ are each an alkyl group having 6 to 22 carbon atoms, m and n are each an integer capable of satisfying the requirement that m+n=1 to 3 and X is as defined above, and subjecting the resin composition to stretch blow molding.

The present invention also provides a polyester container produced by the above-described process.

Namely, the present invention includes a polyester container, which is prepared by subjecting a resin composition, which is obtained by adding 0.1 to 10 parts by weight of either a compound represented by the above formula (I) or a compound represented by the above formula (II) to 100 parts by weight of a polyester resin, to stretch blow molding.

Further scope and the applicability of the present invention will become apparent from the detailed description given hereinafter. However, it should be understood that the detailed description and specific examples, while indicating preferred embodiments Of the invention, are given by way of illustration only, since various changes and modifications within the spirit and scope of the invention will become apparent to those skilled in the art from this detailed description.

DETAILED DESCRIPTION OF THE INVENTION

In the present invention, the additive compound is one member selected from the group consisting of compounds represented by the above formula (I) and compounds represented by the above formula (II).

In the formula (I) according to the present invention, $A_1$ and $A_2$ are each a straight-chain or branched alkyl group or an aralkyl group having a straight-chain or branched alkyl group, and the number of carbon atoms of each of $A_1$ and $A_2$ is from 6 to 22 and can be arbitrarily selected within this range. When the number of carbon atoms of each of $A_1$ and $A_2$ is less than 6, the molecular weight of the compound represented by the general formula (I) is so low that boiling often occurs at the melting temperature of the resin composition containing the compound, which gives rise to foaming. On the other hand, when the number of carbon atoms exceeds 22, the compatibility of the compound with the resin becomes so poor that the effect obtained by incorporating the compound into the resin is unsatisfactory. The number of carbon atoms of each of $A_1$ and $A_2$ is still preferably 8 to 18.

Specific examples of $A_1$ and $A_2$ include straight-chain alkyl groups, such as n-hexyl, n-octyl, n-dodecyl and n-octadecyl groups; branched alkyl groups, such as 2-hexyldecyl and methyl-branched octadecyl groups; and aralkyl groups such as benzyl and 2-phenylethyl groups.

In the formula (I) according to the present invention, X is

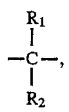

—S—, —SO$_2$—, —O— or a single direct bond, wherein $R_1$ and $R_2$ each stand for a hydrogen atom or an alkyl group having 4 or less carbon atoms, for example, 1 or 2 carbon atoms. Specific examples of $R_1$ and $R_2$ include straight-chain or branched alkyl groups, such as methyl, ethyl, n-propyl, isopropyl, n-butyl, isobutyl, sec.-butyl and t-butyl groups.

The compound represented by the formula (I) according to the present invention can be easily prepared by reacting an aromatic glycol represented by the formula (III):

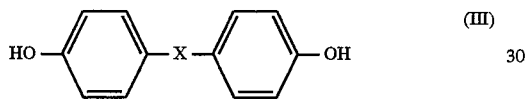

wherein X is as defined above, with an alkyl halide and/or an aralkyl halide each having 6 to 22 carbon atoms, in the presence of an alkali catalyst such as NaOH or KOH.

Specific examples of the compounds represented by the general formula (I) according to the present invention include the following compounds:

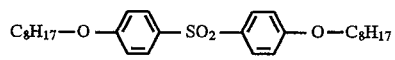

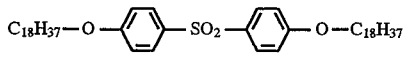

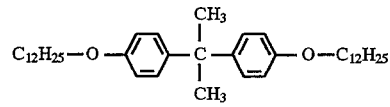

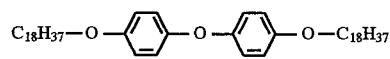

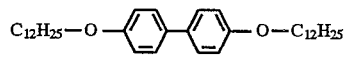

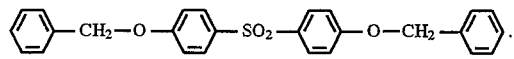

In the formula (II) according to the present invention, $R_3$ and $R_4$ each are a straight-chain or branched alkyl group, and the number of carbon atoms is from 6 to 22 and can be arbitrarily selected within this range. When the number of carbon atoms of $R_3$ or $R_4$ is less than 6, the molecular weight of the compound represented by the formula (II) is so low that boiling often occurs at the melting temperature of the resin composition containing the compound, which gives rise to foaming. On the other hand, when the number of carbon atoms exceeds 22, the compatibility of the compound with the resin becomes so poor that the effect obtained by incorporating the compound into the resin is unsatisfactory. The number of carbon atoms of each of $R_3$ and $R_4$ is still preferably 8 to 18.

Specific examples of $R_3$ and $R_4$ include hexyl, octyl, dodecyl and octadecyl groups.

The total number of $R_3$ and $R_4$ groups, that is m+n in the formula (II), is 1 to 3. When m+n is 0, the molecular weight of the compound represented by the formula (II) is so low that boiling often occurs at the melting temperature of the resin composition containing the compound, which gives rise to foaming. On the other hand, when m+n is 4 or more, the compatibility of the compound with the resin becomes so poor that the effect obtained by incorporating the compound into the resin is unsatisfactory.

In the formula (II) according to the present invention, X is the same as that of the formula (I).

The compound represented by the formula (II) according to the present invention can be easily prepared by known methods. For example, it can be prepared by reacting biphenyl, diphenyl ether, diphenyl sulfide or the like with an α-olefin having 6 to 22 carbon atoms in the presence of a catalyst such as aluminum chloride or boron trifluoride ethyl ether.

Specific examples of the compounds represented by the formula (II) according to the present invention include the following compounds:

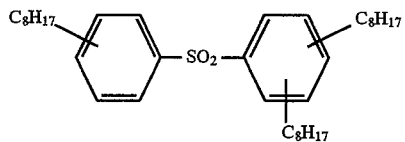

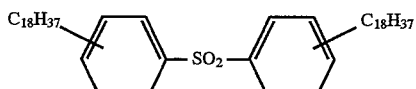

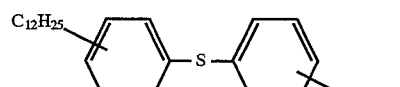

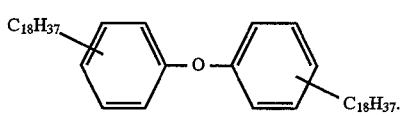

The compound represented by the above formulas (I) or (II) can be homogeneously mixed with a polyester resin with neither fuming nor coloration occurring during melt molding. They have excellent heat resistance.

In the present invention, in order to enhance the strength of the polyester container produced from the resin composition containing the additive compound, it is necessary to add the additive compound in an amount of 0.1 to 10 parts by weight, preferably 0.5 to 8 parts by weight, and still preferably 1 to 5 parts by weight, to 100 parts by weight of the polyester resin.

The additive compound may be added in the course of the production of the polyester resin or in a suitable step after production. The addition thereof after production may be conducted by melt blending them, on a single-screw extruder, a twin-screw extruder, an open roll, a kneader, a mixer, or the like, or dry blending them and then molding the mixture thus obtained into a container.

In the present invention, any polyester resin may be used as long as it has a high stretchability. A polyester resin comprising ethylene terephthalate or ethylene 2,6-naphthalate as the main repeating unit is preferably used, and those comprising ethylene terephthalate as the main repeating unit are particularly preferably used.

The polyester resin used in the present invention and comprising ethylene terephthalate or ethylene 2,6-naphthalate as the main repeating unit may contain other repeating ester unit(s) in an amount of less than 10% by mole, preferably not less than 0% by mole to below 5% by mole. Examples of the dicarboxylic acid components other than terephthalic acid and 2,6-naphthalenedicarboxylic acid include a compound selected from the group consisting of aromatic dicarboxylic acids, such as isophthalic acid, 1,5-, 1,6-, 1,7- and 2,7-naphthalenedicarboxylic acids, phthalic acid, cyclohexanedicarboxylic acid, dibromoisophthalic acid, sodium sulfoisophthalate, diphenyldicarboxylic acid, diphenyl ether dicarboxylic acid, diphenyl sulfone dicarboxylic acid, diphenyl ketone dicarboxylic acid, diphenoxyethanedicarboxylic acid and phenylenedioxydiacetic acid, and aliphatic dicarboxylic acids, such as adipic acid, sebacic acid, succinic acid, glutaric acid, piperic acid, suberic acid, azelaic acid, undecanedioic acid and dodecanedioic acid, and a mixture of two or more of these acids.

The diol components other than ethylene glycol include a compound selected from the group consisting of aliphatic glycols, such as trimethylene glycol, tetramethylene glycol, pentamethylene glycol, hexamethylene glycol, octamethylene glycol, decamethylene glycol, propylene glycol, neopentyl glycol, diethylene glycol and polyethylene glycol, alicyclic glycols, such as cyclohexanedimethanol, and aromatic glycols, such as o-, m- and p-xylene glycols and 2,2-bis(4-hydroxyethoxyphenyl)propane, and a mixture of two or more of these diols.

Further, the polyester resin used in the present invention and comprising ethylene terephthalate or ethylene 2,6-naphthalate as the main repeating unit may contain a hydroxy carboxylic acid such as glycolic acid, hydroxybenzoic acid and hydroxynaphthoic acid, and/or a diphenol such as hydroquinone, resorcinol, dihydroxydiphenyl and dihydroxy diphenyl ether as the comonomer.

When the polyester resin comprises ethylene terephthalate as the main repeating unit, the polyester resin preferably contain other repeating ester unit(s) comprising a dicarboxylic acid component selected from the group consisting of isophthalic acid, 1,5-, 1,6-, 1,7-, 2,6-, and 2,7-naphthalenedicarboxylic acids, phthalic acid, cyclohexanedicarboxylic acid, dibromoisophthalic acid, diphenyldicarboxylic acid, diphenyl ether dicarboxylic acid, diphenyl sulfone dicarboxylic acid, diphenyl ketone dicarboxylic acid, diphenoxyethanedicarboxylic acid, phenylenedioxy-diacetic acid, adipic acid, sebacic acid, succinic acid, glutaric acid, piperic acid, suberic acid, azelaic acid, undecanedioic acid, dodecanedioic acid, glycolic acid, hydroxybenzoic acid and hydroxy-naphthoic acid, and/or a diol component selected from the group consisting of trimethylene glycol, tetramethylene glycol, pentamethylene glycol, hexamethylene glycol, octamethylene glycol, decamethylene glycol, propylene glycol, neopentyl glycol, diethylene glycol, cyclohexanedimethanol, o-, m- and p-xylene glycols, hydroquinone, resorcinol, dihydroxydiphenyl and dihydroxy diphenyl ether.

The molecular weight of the polyester resin is preferably 0.6 or more in terms of intrinsic viscosity measured at 25° C. in phenol/tetrachloroethane (weight ratio=60:40). When the intrinsic viscosity is less than 0.6, the strength of the container sometimes becomes unsatisfactory.

The resin composition as the raw material of the container according to the present invention comprises the polyester resin described above and 0.1 to 10 parts by weight, based on 100 parts by weight of the polyester resin, of the additive compound described above. If necessary, various other additives, for example, colorants, oxidation stabilizers, ultraviolet absorbers, antistatic agents and flame retardants, may be incorporated into the resin composition.

In the present invention, the method for molding a container is preferably a biaxial stretch blow molding which is used in the production of a polyethylene terephthalate (PET) container. In this case, use may be made of any of the cold parison methods, wherein a preform (a preliminary molding) is taken out and then is subjected to stretch blow molding in a separate step, and also the hot parison methods, wherein the step of forming a preform is continuously followed by the step of stretch blow molding.

In the present invention, merely when the compound represented by the above formulas (I) or (II) is added to a polyester resin, the effect attained is small, but the effect of the present invention can be attained by conducting the stretch blow molding step.

When the product of the stretching ratios in the longitudinal and lateral directions of the preform and container, determined from respective dimensional ratios of the length and width exclusive of a nonstretched mouth portion, is defined as an areal stretching ratio, the areal stretching ratio is preferably 4 or more, still more preferably 4 to 12, and most preferably 5 to 10, in the present invention. When this ratio is less than 4, the incremental increase in strength is small as compared with the case where no compound represented by the above formulas (I) or (II) is added.

The stretch blow molding is preferably conducted at a temperature of from 90° to 130° C., and still more preferably from 110° to 130° C. for polyethylene terephthalate. The stretch blow molding temperature for polyethylene naphthalate ranges preferably from 110° to 160° C., and still more preferably from 120° to 140° C.

Although the reason for the increase in strength attained in the present invention has not yet been elucidated, it is conceivable that the addition of the compound represented by the above formulas (I) or (II) facilitates the orientation of the polyester resin during stretching.

Further, the compounds represented by the above formulas (I) or (II) exhibit the property of lowering the melt viscosity of a polyester resin composition, which contributes to an improvement in the moldability of the polyester resin composition during the step of injection for molding a preform, which leads to an improvement in productivity.

The polyester container of the present invention is useful when a higher strength than usual is required, or when it is desired to reduce the wall thickness of the container by reducing the amount of the resin, which contributes to a savings in resources.

EXAMPLES

The present invention will now be described in detail with reference to the following Examples, though it is not limited to these Examples only. In the Examples, "part(s)" is intended to mean part(s) by weight unless otherwise specified.

Examples 1 to 7

Each of the compounds A to E represented by the following formulae was added in an amount specified in Table 1 to 100 parts by weight of a polyethylene terephthalate resin (J-155, [η]=0.9 dl/g, manufactured by Mitsui PET Resin Co., Ltd.) and the mixture thus obtained was dried at 140°

C. for 4 hours and melt-kneaded at 270° to 280° C. on a twin-screw extruder. The obtained strand was cooled with water and cut into pellets.

compound A;

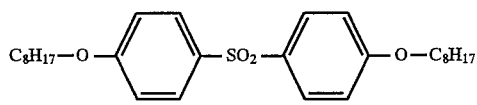

compound B;

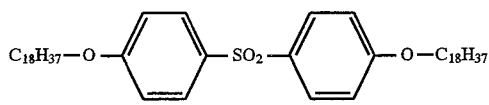

compound C;

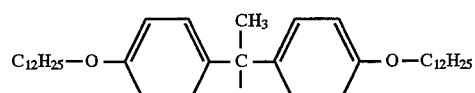

compound D;

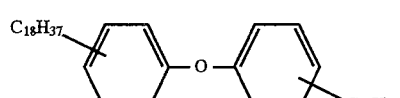

compound E;

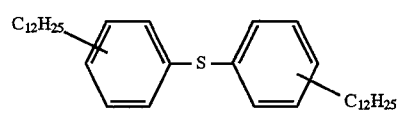

These pellets were dried at 140° C. for 4 hours and injection-molded into a preform (a preliminary molding) having a size (a dimension exclusive of the mouth portion) of 20 mm in outer diameter and 85 mm in length, and having a weight of 23 g. The molding conditions include a preset cylinder temperature of 280° C. and a preset mold temperature of 20° C.

Subsequently, the preform was subjected to biaxial stretch blow molding at 110° C. to provide a cylindrical container having a capacity of 1 l, a diameter of 90 mm in the barrel portion, a height exclusive of the mouth portion of 160 mm and a diameter of 20 mm in the mouth portion.

Stretching ratios of this container are 1.9 in the longitudinal direction and 4.5 in the lateral direction, and the areal stretching ratio is 8.6.

A hot-parison injection blow molding machine manufactured by Nissei ASB Machine Co., Ltd. was used as the molding machine.

The container thus formed was subjected to measurement of the drop strength and tensile strength. The results are given in Table 1.

Testing Method

Drop Strength

The container was filled with water, capped, and subjected to gravity dropping from a height of 1 m on a concrete surface. 10 containers were dropped ten times at the maximum, and the drop strength was evaluated according to the number of times of dropping necessary to break two containers (20%).

Tensile Strength

The container was cut open to prepare a dumbbell No. 3 test piece. The stress was measured while pulling the test piece at a constant rate of 10 mm/min with Tensilon UCT-100 manufactured by Orientec Co., Ltd. to determine the stress at yield, stress at break and modulus of elasticity.

COMPARATIVE EXAMPLE 1

Molding and evaluation of the property were conducted in the same manner as those of Examples 1 to 7, except that only the polyethylene terephthalate was used without additive (I) or (II). The results are given in Table 1.

TABLE 1

| | Compound represented by the general formulas (I) or (II) | | Drop strength of the container (no. of times necessary to break 20%) | Tensile strength of piece of container | | |
|---|---|---|---|---|---|---|
| | Kind | Amt. of addn. | | Stress at yield (kgf/cm$^2$) | Stress at break (kgf/cm$^2$) | Modulus of elasticity (kgf/cm$^2$) |
| Ex. 1 | A | 3 parts | intact after dropping ten times | 3800 | 4000 | 60000 |
| Ex. 2 | B | 3 parts | intact after dropping ten times | 3500 | 3800 | 59000 |
| Ex. 3 | C | 3 parts | intact after dropping ten times | 3600 | 3800 | 59000 |
| Ex. 4 | D | 3 parts | intact after dropping ten times | 3700 | 4000 | 60000 |
| Ex. 5 | E | 3 parts | intact after dropping ten times | 3600 | 3900 | 58000 |
| Ex. 6 | A | 1 part | intact after dropping ten times | 3400 | 3600 | 49000 |
| Ex. 7 | A | 5 parts | intact after dropping ten times | 3700 | 3900 | 58000 |
| Comp. Ex. 1 | — | — | broken in 6th dropping | 2800 | 2900 | 45000 |

Examples 8 to 14

Molding was conducted in the same manner as that of Examples 1 to 7, except that the compounds A to E used therein were used in respective amounts specified in the Table 2 and the configurations of the preform and container were different from those of Examples 1 to 7.

The preform had an outer diameter of 28 mm, a length of 90 mm and a weight of 32 g, and the container was molded into a cylindrical shape having a capacity of 600 ml, a diameter of 60 mm in the barrel portion, a height exclusive of the mouth portion of 200 mm, and a diameter of 27 mm in the mouth portion.

Stretching ratios of this container are 2.2 in the longitudinal direction and 2.1 in the lateral direction, and the areal stretching ratio is 4.6. The results of this evaluation are given in Table 2.

COMPARATIVE EXAMPLE 2

Molding and evaluation of the property were conducted in the same manner as those of Examples 8 to 14, except that only the polyethylene terephthalate was used without additive (I) or (II). The results are given in Table 2.

temperature of 20° C. and a blow temperature in the biaxial stretching of 130° C. The results of this evaluation are given in Table 3.

Preparation of Polyethylene 2,6-naphthalate resin

Poly(ethylene 2,6-naphthalenedicarboxylate), that is, polyethylene 2,6-naphthalate resin, was prepared by stirring under heating a mixture of 146.4 g of dimethyl 2,6-naphthalenedicarboxylate, 74.4 g of ethylene glycol and 100 ppm of titanium from titanium tetraisopropoxide. More particularly, the reaction was conducted as follows:

(1) The mixture was maintained under nitrogen at 190° C. for 1 hour, the temperature was raised to 210° C., and maintained at 210° C. for 1 hour while distilling out methanol from the reaction system.

(2) The temperature was raised to 285° C., and then nitrogen was purged from the reaction system.

TABLE 2

| | Compound represented by the general formulas (I) or (II) | | Drop strength of the container (no. of times necessary to break 20%) | Tensile strength of piece of container | | |
|---|---|---|---|---|---|---|
| | | | | Stress at yield | Stress at break | Modulus of elasticity |
| | Kind | Amt. of addn. | | (kgf/cm²) | (kgf/cm²) | (kgf/cm²) |
| Ex. 8 | A | 3 parts | intact after dropping ten times | 1300 | 2800 | 30000 |
| Ex. 9 | B | 3 parts | intact after dropping ten times | 1200 | 2800 | 29000 |
| Ex. 10 | C | 3 parts | intact after dropping ten times | 1300 | 2700 | 30000 |
| Ex. 11 | D | 3 parts | intact after dropping ten times | 1300 | 2700 | 28000 |
| Ex. 12 | E | 3 parts | intact after dropping ten times | 1200 | 2700 | 26000 |
| Ex. 13 | A | 1 part | intact after dropping ten times | 1100 | 2600 | 26000 |
| Ex. 14 | A | 5 parts | intact after dropping ten times | 1400 | 3100 | 31000 |
| Comp. Ex. 2 | — | — | intact after dropping ten times | 1000 | 2400 | 24000 |

Examples 15 to 21

Molding and evaluation were conducted in the same manner as those of Examples 1 to 7, except that a polyethylene 2,6-naphthalate resin ([η]=0.81 dl/g), synthesized as described below, was used as the polyester resin instead of the polyethylene terephthalate resin, and compounds A to E used in Examples 1 to 7 were used in the respective amounts specified in Table 3.

In this case, the molding was conducted under the conditions of a preset cylinder temperature of 290° C., a mold (3) The pressure of the reaction system was reduced and melt condensation was continued at 285° C. for 100 minutes under 0.2 mm of mercury pressure.

(4) Heating was stopped and the pressure of the reaction system was lowered to atmospheric pressure with nitrogen.

COMPARATIVE EXAMPLE 3

Molding and evaluation of the property were conducted in the same manner as those of Examples 15 to 21, except that only the polyethylene 2,6-naphthalate resin was used. The results are given in Table 3.

TABLE 3

| | Compound represented by the general formulas (I) or (II) | | Drop strength of the container (no. of times necessary to break 20%) | Tensile strength of piece of container | | |
|---|---|---|---|---|---|---|
| | | | | Stress at yield | Stress at break | Modulus of elasticity |
| | Kind | Amt. of addn. | | (kgf/cm²) | (kgf/cm²) | (kgf/cm²) |
| Ex. 15 | A | 3 parts | intact after dropping ten times | 4000 | 4200 | 64000 |
| Ex. 16 | B | 3 parts | intact after dropping ten times | 3900 | 3900 | 65000 |
| Ex. 17 | C | 3 parts | intact after dropping ten times | 4000 | 4100 | 63000 |

TABLE 3-continued

| | Compound represented by the general formulas (I) or (II) | | Drop strength of the container (no. of times necessary to break 20%) | Tensile strength of piece of container | | |
|---|---|---|---|---|---|---|
| | | | | Stress at yield (kgf/cm²) | Stress at break (kgf/cm²) | Modulus of elasticity (kgf/cm²) |
| | Kind | Amt. of addn. | | | | |
| Ex. 18 | D | 3 parts | intact after dropping ten times | 4100 | 4300 | 63000 |
| Ex. 19 | E | 3 parts | intact after dropping ten times | 3900 | 4200 | 62000 |
| Ex. 20 | A | 1 part | intact after dropping ten times | 3700 | 3800 | 58000 |
| Ex. 21 | A | 5 parts | intact after dropping ten times | 3900 | 4100 | 64000 |
| Comp. Ex. 3 | — | — | broken in 4th dropping | 3400 | 3500 | 54000 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A process for producing a polyester container having increased mechanical strength, which comprises:

(a) preparing a polyester resin composition comprising a polyester resin and 1 to 5 parts by weight, based on 100 parts by weight of the polyester resin, of an additive compound represented by the formula (I):

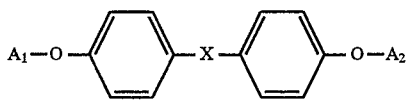

where $A_1$ and $A_2$ are each an alkyl or aralkyl group having 6 to 22 carbon atoms and X is

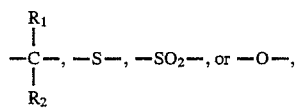

wherein $R_1$ and $R_2$ are each an alkyl group having 4 or fewer carbon atoms, (b) forming a preform from said resin composition, and
   (c) stretch blow molding said preform to an areal stretching ratio of 4 or more, to form said polyester container.

2. The process for producing a polyester container having increased mechanical strength according to claim 1, wherein said resin composition is prepared by adding the additive compound during the production of the polyester resin.

3. The process for producing a polyester container having increased mechanical strength according to claim 1, wherein said resin composition is prepared by melt blending the additive compound with the polyester resin.

4. The process for producing a polyester container having increased mechanical strength according to claim 1, wherein said resin composition is prepared by dry blending the additive compound with the polyester resin.

5. The process for producing a polyester container having increased mechanical strength according to claim 1, wherein said polyester resin contains a repeating unit selected from the group consisting of ethylene terephthalate and ethylene 2,6-naphthalate.

6. The process for producing a polyester container having increased mechanical strength according to claim 5, wherein said polyester resin contains a repeating unit which is ethylene terephthalate.

7. The process for producing a polyester container having increased mechanical strength according to claim 1, wherein $A_1$ and $A_2$ are each an alkyl or aralkyl group having 8 to 18 carbon atoms.

8. The process for producing a polyester container having increased mechanical strength according to claim 1, wherein $R_1$ and $R_2$ are each an alkyl group of 1 or 2 carbon atoms.

9. The process for producing a polyester container having increased mechanical strength according to claim 1, wherein $R_1$ and $R_2$ are each selected from the group consisting of methyl, ethyl, n-propyl, isopropyl, n-butyl, isobutyl, sec.-butyl, and t-butyl.

10. The process for producing a polyester container having increased mechanical strength according to claim 1, wherein said compound of formula (I) is selected from the group consisting of

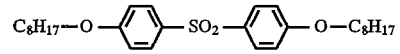

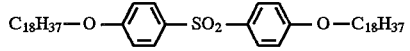

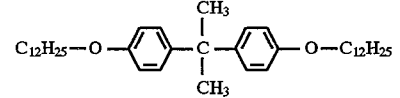

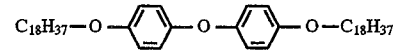

and

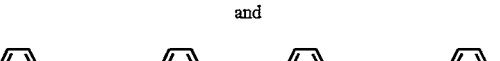

11. The process for producing a polyester container having increased mechanical strength according to claim 6, wherein said resin contains an additional repeating unit selected from the group consisting of isophthalic acid, 1,5-, 1,6-, 1,7-, 2,6-, and 2,7- naphthalenedicarboxylic acids, phthalic acid, cyclohexanedicarboxylic acid, dibromoisophthalic acid, diphenyldicarboxylic acid, diphenyl ether dicarboxylic acid, diphenyl sulfone dicarboxylic acid, diphenyl ketone dicarboxylic acid, diphenoxyethanedicarboxylic acid, phenylenedioxy-diacetic acid, adipic acid, sebacic acid, succinic acid, glutaric acid, piperic acid, suberic acid, azelaic acid, undecanedioic acid, dodecanedioic acid, glycolic acid, hydroxybenzoic acid, hydroxy-naphthoic acid, trimethylene glycol, tetramethylene glycol, pentamethylene glycol, hexamethylene glycol, octamethylene glycol, decamethylene glycol, propylene glycol, neopentyl glycol, diethylene glycol, cyclohexanedimethanol, o-, m- and p-xylene glycols, hydroquinone, resorcinol, dihydroxydiphenyl and dihydroxy diphenyl ether.

12. The process for producing a polyester container having increased mechanical strength according to claim 1, wherein said polyester resin has a molecular weight, expressed in terms of intrinsic viscosity, of 0.6 or more at 25° C. in phenol/tetrachloroethane at a weight ratio of 60:40.

13. The process for producing a polyester container having increased mechanical strength according to claim 1, wherein said areal stretching ratio is 4 to 12.

14. The process for producing a polyester container having increased mechanical strength according to claim 1, wherein said stretch blow molding of said preform is carried out at a temperature of from 90° to 160° C.

15. The process for producing a polyester container having increased mechanical strength according to claim 1, wherein said forming of said preform and said stretch blow molding are carried out as separate steps.

16. The process for producing a polyester container having increased mechanical strength according to claim 1, wherein said forming of said preform is continuously followed by said stretch blow molding.

17. In a process for producing a polyester container having increased mechanical strength by (a) forming a preform from a polyester resin composition and (b) stretch blow molding said preform to an areal stretch ratio of 4 or more to form said polyester container, the improvement comprising forming said preform from a polyester resin composition comprising:

(1) a polyester resin; and (2) 1 to 5 parts by weight, based on 100 parts by weight of said polyester resin, of an additive compound represented by the formula (I):

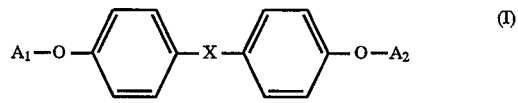

wherein $A_1$ and $A_2$ are each an alkyl or aralkyl group having 6 to 22 carbon atoms and X is

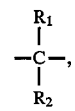

wherein $R_1$ and $R_2$ are each an alkyl group having 4 or fewer carbon atoms.

18. A polyester container having increased mechanical strength produced by the process as set forth in claim 1.

* * * * *